(12) United States Patent
Cooper

(10) Patent No.: US 9,477,072 B2
(45) Date of Patent: Oct. 25, 2016

(54) SYSTEMS AND METHODS FOR ILLUMINATION PHASE CONTROL IN FLUORESCENCE MICROSCOPY

(75) Inventor: Jeremy R. Cooper, Issaquah, WA (US)

(73) Assignee: GE HEALTHCARE BIO-SCIENCES CORP., Piscataway, NJ (US)

( * ) Notice: Subject to any disclaimer, the term of this patent is extended or adjusted under 35 U.S.C. 154(b) by 301 days.

(21) Appl. No.: 14/002,397

(22) PCT Filed: Feb. 29, 2012

(86) PCT No.: PCT/SE2012/050227
§ 371 (c)(1),
(2), (4) Date: Aug. 30, 2013

(87) PCT Pub. No.: WO2012/118436
PCT Pub. Date: Sep. 7, 2012

(65) Prior Publication Data
US 2013/0335819 A1   Dec. 19, 2013

Related U.S. Application Data

(60) Provisional application No. 61/447,707, filed on Mar. 1, 2011.

(51) Int. Cl.
*G02B 21/06* (2006.01)
*G02B 21/14* (2006.01)
(Continued)

(52) U.S. Cl.
CPC .......... *G02B 21/06* (2013.01); *G02B 21/0032* (2013.01); *G02B 21/0076* (2013.01);
(Continued)

(58) Field of Classification Search
CPC .. G02B 21/06; G02B 27/1093; G02B 21/14; G02B 27/144; G02B 26/0875
USPC ....... 359/389, 362, 363, 368, 369, 370, 371, 359/372, 384, 385, 386, 388, 390, 577, 359/197.1, 199.1, 199.2, 199.3, 199.4, 359/201.1, 221.2, 226.2
See application file for complete search history.

(56) References Cited

U.S. PATENT DOCUMENTS 7,848,017 B2   12/2010   Ouchi et al.
2008/0020938 A1   1/2008   Kaplan
(Continued)

FOREIGN PATENT DOCUMENTS

DE   102006031177   1/2008
DE   102007047466   4/2009
(Continued)

OTHER PUBLICATIONS

Mats G. L. Gustafsson, Lin Shao, Peter M. Carlton, C. J. Rachel Wang, Inna N. Golubovskaya, W. Zacheus Cande, David A. Agard, and John W. Sedat; "Three-Dimensional Resolution Doubling in Wide-Field Fluorescence Microscopy by Structured Illumination" Biophysical Journal; Jun. 2008; vol. 94, pp. 4957-4970.*
(Continued)

*Primary Examiner* — Stephone B Allen
*Assistant Examiner* — Rahman Abdur
(74) *Attorney, Agent, or Firm* — Sutherland Asbill & Brennan LLP

(57) ABSTRACT

Illumination phase controls that provide precise and fast phase control of structured illumination patterns used in structure illumination microscopy are described. A coherent light source is used to generate a beam of coherent light that is split into at least three coherent beams of light. In one aspect, an illumination phase control is composed of at least one pair of rotatable windows to apply at least one phase shift to at least one of the beams. An objective lens is to receive the beams and focus the at least three beams to form an interference pattern. The phase control can be used to change the position of the interference pattern by changing the at least one phase shift applied to the at least one beam.

18 Claims, 10 Drawing Sheets

(51) Int. Cl.
  *G02B 26/08* (2006.01)
  *G02B 27/10* (2006.01)
  *G02B 27/14* (2006.01)
  *G02B 21/00* (2006.01)
  *G02B 21/36* (2006.01)
  *G02B 27/58* (2006.01)

(52) U.S. Cl.
  CPC ............ *G02B21/14* (2013.01); *G02B 21/367* (2013.01); *G02B 26/0875* (2013.01); *G02B 27/106* (2013.01); *G02B 27/1093* (2013.01); *G02B 27/144* (2013.01); *G02B 27/58* (2013.01)

(56) References Cited

U.S. PATENT DOCUMENTS

| | | | |
|---|---|---|---|
| 2008/0186553 A1* | 8/2008 | Stenton | G02B 26/108 359/211.1 |
| 2009/0219607 A1 | 9/2009 | Saggau et al. | |
| 2009/0225407 A1* | 9/2009 | Nakayama | G02B 21/16 359/370 |
| 2010/0049055 A1 | 2/2010 | Freudenberg et al. | |

FOREIGN PATENT DOCUMENTS

| | | |
|---|---|---|
| JP | 2003084206 | 3/2003 |
| JP | 2007-250762 A | 9/2007 |
| JP | 2007-267927 A | 10/2007 |
| JP | 2007-279287 A | 10/2007 |
| JP | 2010-151591 A | 7/2010 |

OTHER PUBLICATIONS

Three-Dimentional Resolution Doubling in Wide-Field Flurescence Microscopy by Structured Illumination, Mats G I Gustatssion et al., Biophysical Journal Biophys, V 94(12); Jun. 15, 2008, PMC2397368.*
JP Office Action for JP Application No. 2013-556581 mailed Feb. 2, 2016 (2 pages).
European Office Action for EP Application No. 12752425.4 mailed Jul. 7, 2015 (4 pages).
Tiziani, "5 Optical Interferometry in Metrology," ISBN: 97838169077710, 1993, pp. 103-130, XP055199343, http://elib.uni.stuttgart.de/opus/volltexte/2011/6178/pdf/tiz125.pdf.
Karadaglic, D., et al., Micron, vol. 39, No. 7, 2008, pp. 808-818.
Myoungki, A., et al., Measurement Science and Technology, vol. 22, 2011, 015503, 8pp.
Patterson, G. H, Seminars in Cell and Developmental Biology, vol. 20, No. 8, 2009, pp. 886-893.

* cited by examiner

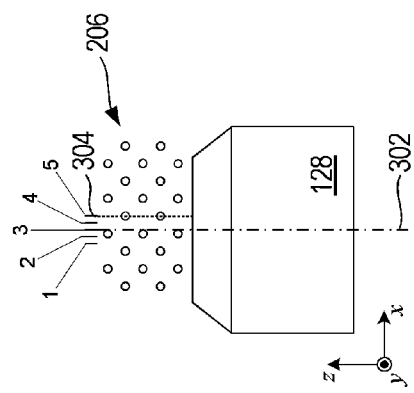
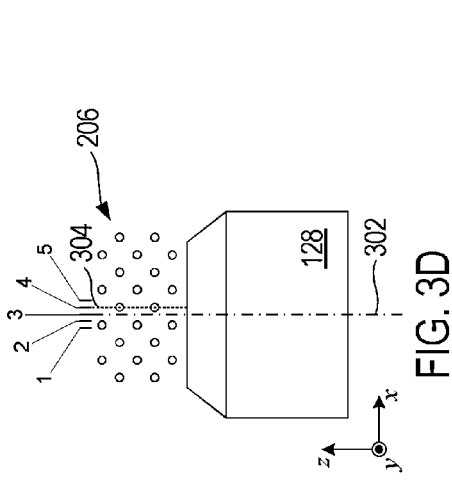
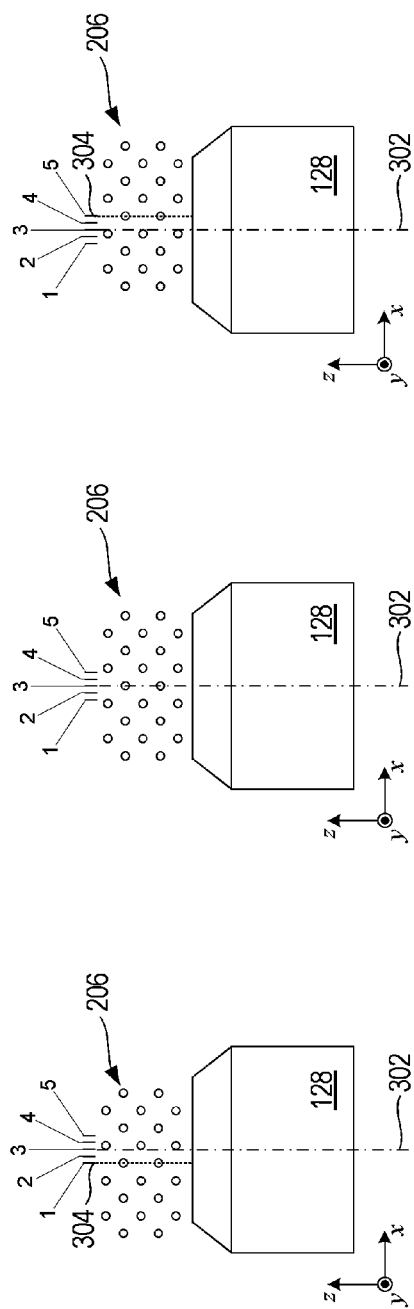
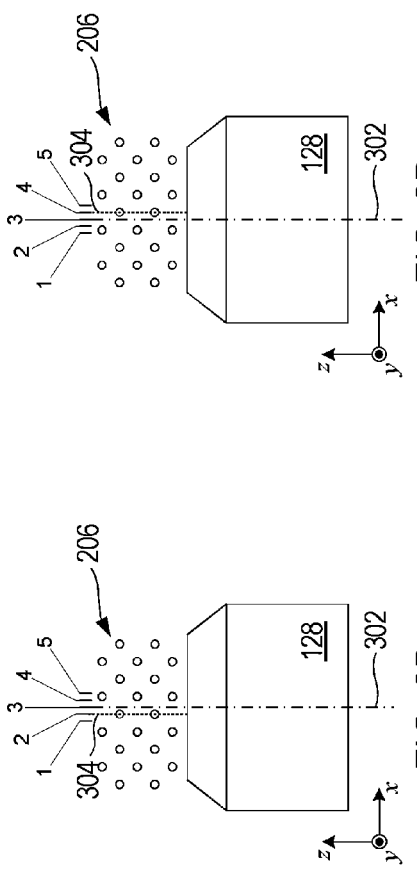

SYSTEMS AND METHODS FOR ILLUMINATION PHASE CONTROL IN FLUORESCENCE MICROSCOPY

CROSS-REFERENCE TO A RELATED APPLICATION

This application is a filing under 35 U.S.C. 371 of international application number PCT/SE2012/050227, filed Feb. 29, 2012, published on Sep. 7, 2012 as WO 2012/118436, which claims the benefit of Provisional Application No. 61/447,707; filed Mar. 1, 2011.

TECHNICAL FIELD

This disclosure relates to fluorescence microscopy and, in particular, to systems to control the phase of excitation light used to illuminate a specimen.

BACKGROUND

Precise phase control of light sources in microscope instruments is important for various optical techniques that involve interference of separate beams as well as polarization optics. For instance, phase control is used in phase contrast microscopy, differential interference microscopy, and polarized light microscopy. In particular, precise and fast phase control is used in structured illumination microscopy, in which phase control of interfering beams is accomplished with precise changes in path lengths of separate beam paths on the order of fractions of a wavelength, which for visible light corresponds to a change in the path length of 10 nanometers or less. Typically, a piezo-electric translation device with a mounted mirror can be used to generate precise phase control. As the mirror is translated parallel to the beam path, the path of the beam is lengthened or shortened by approximately 2 times the minor travel distance. Although the position of the mirror can be changed on order of 1-2 milliseconds, the devices are expensive and generate a detectable amount of beam translation except for a 0° angle of incidence. An alternative approach is to use an electronically deformable window to modulate the phase. A voltage applied to the window changes the thickness of the window by fractions of a wavelength, which results in a change in the effective path length of the light transmitted through the window. Unlike the piezo-electric device, the deformable window transmits the beam without beam translation. However, deformable windows are considerably slower with switching times on the order of tens to hundreds of milliseconds and it is difficult to achieve extremely low optical distortion, because the window is undergoing physical deformation. For the above described reasons, engineers, scientists, and microscope manufacturers continue to seek faster systems and methods for changing the phase in the light used to illuminate a specimen.

SUMMARY

Illumination phase controls that provide precise and fast phase control of structured illumination patterns used in structure illumination microscopy are described. A coherent light source is used to generate a beam of coherent light that is split into at least three coherent beams of light. In one aspect, an illumination phase control is composed of at least one pair of rotatable windows to apply at least one phase shift to at least one of the beams. An objective lens is to receive the beams and focus the at least three beams to form an interference pattern. The phase control can be used to change the position of the interference pattern by changing the at least one phase shift applied to the at least one beam.

DESCRIPTION OF THE DRAWINGS

FIGS. 3A-3E show bright lines of an interference pattern stepped through five periods of a spatial interval.

DETAILED DESCRIPTION

Various illumination phase controls ("IPCs") are described along with a general description of three-dimensional structured illumination microscopy ("3D-SIM"). 3D-SIM achieves a factor of two improvement in lateral and axial resolution compared to conventional wide-field fluorescence microscopes used in cell biology. 3D-SIM requires no specialized fluorescent dyes or proteins, unlike certain competing super-resolution techniques. Biologists achieve high resolution with 3D-SIM, but retain convenient and familiar fluorescence labeling techniques. The illumination phase control provides for capturing multiple images of the subject by a shifting and rotating illumination pattern. Higher resolution can be achieved by solving a system of equations to restore the fine spatial detail normally blurred by diffraction.

Figure 1:
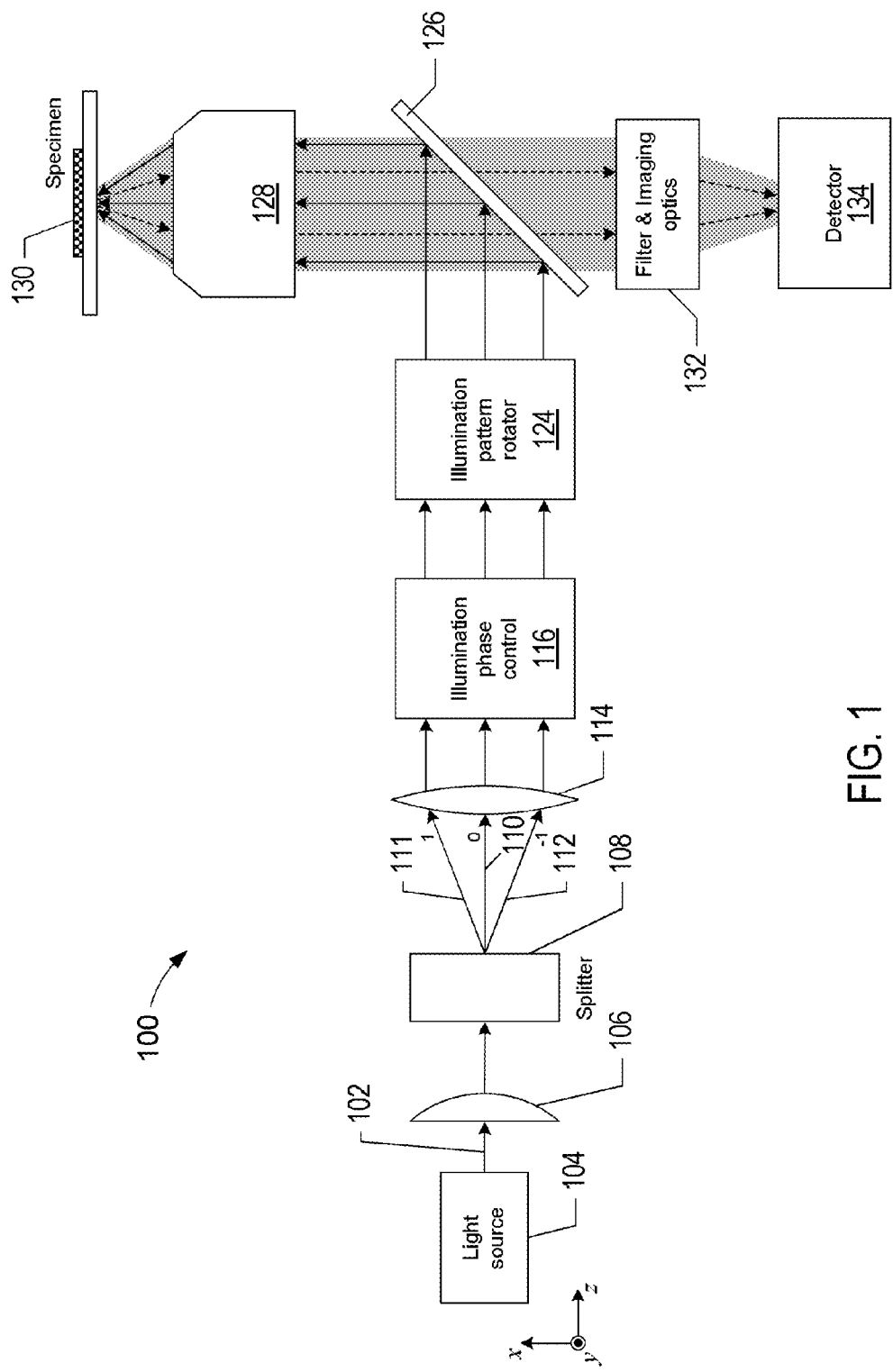
FIG. 1 shows a schematic representation of an example three-dimensional structured illumination microscopy instrument.

FIG. 1 shows a schematic representation of an example 3D-SIM instrument 100. There are many different types of SIM instruments and corresponding optical paths. Instrument 100 is not intended to represent the optical paths within all the different, well-known variations of instruments used in SIM microscopy, but is instead intended to illustrate the general principals of a SIM that includes an IPC. A high-intensity, substantially monochromatic beam 102 of coherent light is output from a light source 104, such as a laser, and transmitted through a lens or a series of lenses 106 that collimate the beam 102. The beam 102 can be output from the source 104 with a particular polarization. The beam 102 then passes through a splitter 108 that splits the beam into three separate coherent beams 110-112. For example, the splitter 108 can be a one-dimensional, transmissive diffraction grading that splits the light into three divergent, coplanar (i.e., xz-plane) coherent beams 110-112 referred to as the $0^{th}$, $+1^{st}$, and $-1^{st}$ order diffracted beams, respectively. The splitter 108 can be any one of a variety of different types of transmissive gratings. For example, the splitter 108 can be a one-dimensional transmissive grating composed of a transparent plate of glass with a series of substantially parallel grooves formed in one surface of the grating or the splitter 108 can be an opaque plate with a series of substantially parallel thin slits. Alternatively, the splitter 108 can be two or more beamsplitters arranged to split the beam of light output from the lens 106 into three or more separate coherent beams. The three beams 110-112 pass through a lens or a series of lenses 114 which reorient the beams 110-112 so that the beams lie in the xz-plane and the $+1^{st}$ and $-1^{st}$ order diffracted beams 111 and 112 are nearly parallel to the $0^{th}$ order diffracted beam 110. In the example of FIG. 1, the beams 111 and 112 pass through an IPC 116 that controls the phase of one or more of the beams 110-112. The beams 110-112 then pass through an illumination pattern rotator ("IPR") 124 and are reflected off of a dichroic mirror 126 to enter an objective lens 128. In the example of FIG. 1, the beams 110-112 are focused within a specimen 130 so that the beams interfere with one another to generate a high-contrast, three-dimensional structured-illumination pattern within a volume of the specimen 130.

Figure 2A:
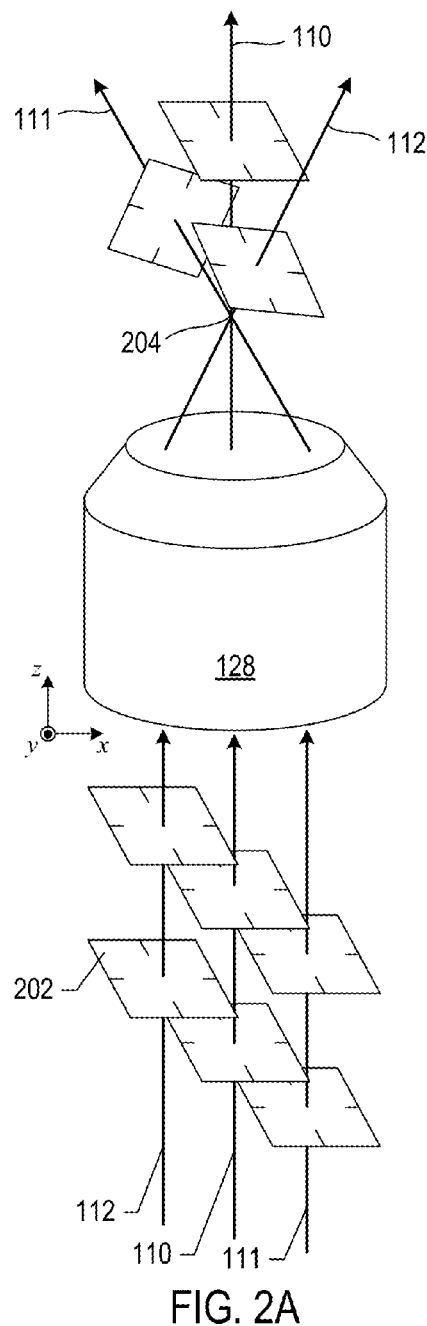
FIGS. 2A-2C show a representation of a three-dimensional structured-illumination pattern using three coherent beams.
Figure 2B:
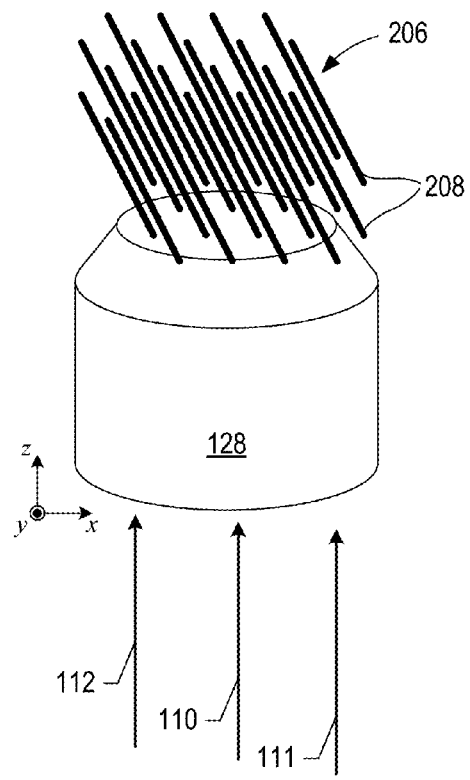
Figure 2C:
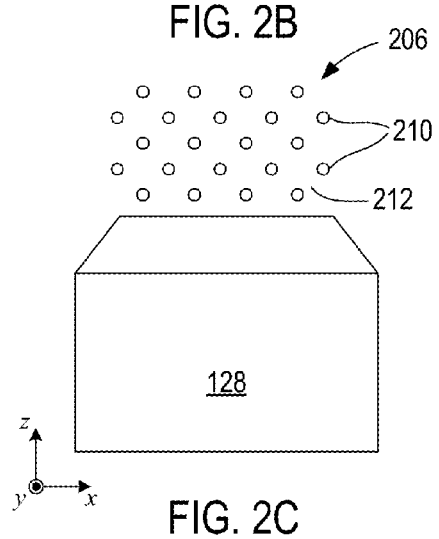

FIGS. 2A-2C show generation of a three-dimensional structured-illumination pattern using three coherent beams. As shown in FIG. 2A, the beams 110-112 are transmitted into the back of the objective lens 128. Because the beams 110-112 originate from a coherent light source 102, the beams 110-112 have plane waves in which the phases of component waves of the beams are identical across any plane, such as plane 202, normal to the beam direction. While the beams 110-112 are coherent, each beam may have a different phase displacement than the other two beams. The objective lens 128 focuses the incident beams to a focal point 204, which changes the direction of the two non-axial beams 111 and 112, as shown in FIG. 2A. As a result, the three plane waves are no longer parallel with wave vectors having different directions and the three sets of plane waves intersect to form a three-dimensional pattern of bright lines, due to constructive interference, surrounded by dark regions, due to destructive interference. In other words, as shown in the example of FIG. 2B, a stationary interference pattern 206 is located in the focal plane of the objective lens 128. Lines 208 represent bright lines of excitation light separated by darker regions. The lattice of bright lines of the excitation light comprise the interference pattern 206 cause fluorescent emission of light from fluorophores in the specimen 130 (not shown). FIG. 2C shows a side view of the objective lens 128 and an end-on view of the bright lines comprising the three-dimensional interference pattern 206. Open circles 210 represent an end-on view of the bright lines of excitation light separated by darker regions 212. Each bright line excites fluorescence of fluorophores attached to components of the specimen 220 that intersect the bright line. Fluorophores attached to components of the specimen 220 that are located in the dark regions 212 between the bright lines 210 do not fluoresce.

Returning to FIG. 1, the objective lens 128 captures and directs a portion of the fluorescent light emitted from the fluorophores to the dichroic minor 126. The fluorescent light passes through the dichroic mirror 126 to filter and imaging optics 132, which filters stray excitation light and focuses the fluorescent light onto a sensor of a detector 134. For example, the detector 134 can be a photodetector array, CCD camera, or a CMOS camera.

3D-SIM image data is acquired by taking a fluorescence image excited by the interference pattern, moving the interference pattern by a period perpendicular to the optical axis of the objective lens 128, followed by taking another image, and repeating these steps for a total of n images. The splitter 112 can be translated in the x-direction, shown in FIG. 1, to step the interference pattern perpendicular to the optical axis of the objective lens by a period. FIGS. 3A-3E show an example of stepping the interference pattern 206 through five periods of a spatial interval centered about the optical axis 302 of the objective lens 128. In the example of FIGS. 3A-3E, the bright lines of the interference pattern 206 are directed substantially perpendicular to the z-axis, as described above with reference to FIG. 2. Marks labeled 1-5 in FIGS. 3A-3E, represent five periods of a spatial interval centered about the optical axis 302. Dotted line 304 identifies the center of the interference pattern 206. FIGS. 3A-3E represent five discrete steps in which the interference pattern 206 is translated substantially perpendicular to the optical axis 302. For example, in FIG. 3A, the interference pattern 206 is in the first period denoted by "1," and in FIG. 3B, the interference pattern 206 is stepped to the second period denoted by "2." At each of the five periods represented in FIGS. 3A-3E, a fluorescence image excited by the interference pattern 206 is captured. The final step rewinds to reset the interference pattern for the next cycle.

Figure 4A:
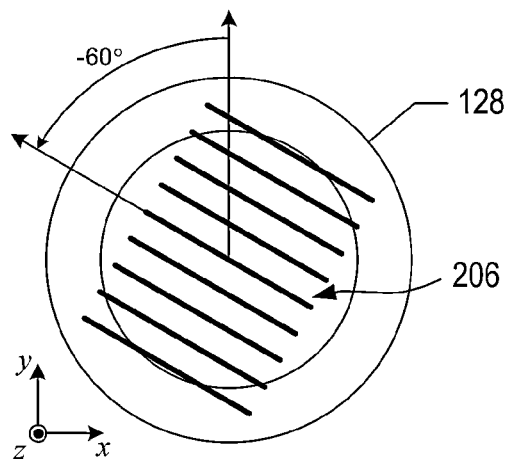
FIGS. 4A-4C show top views of an objective lens and three angular positions of an interference pattern.
Figure 4B:
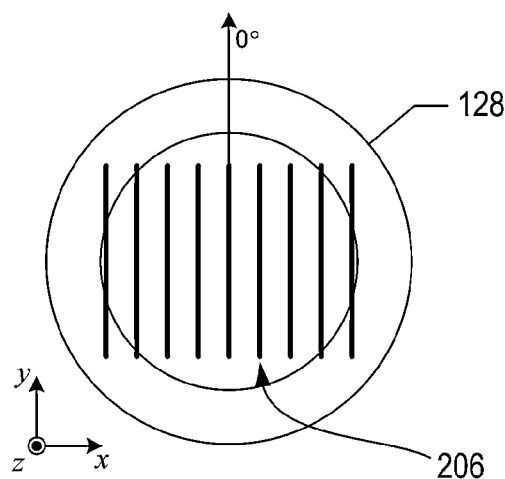
Figure 4C:
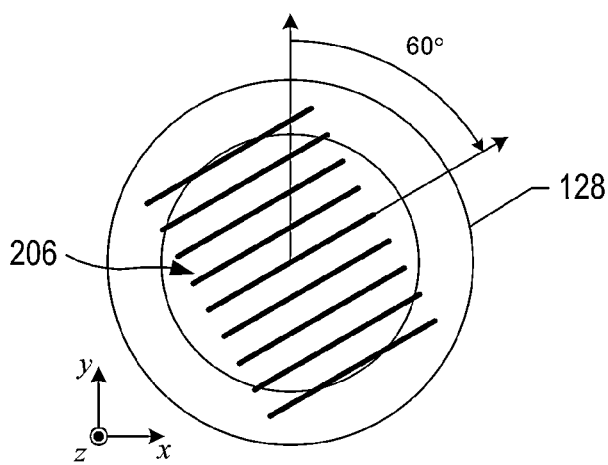

The interference pattern 206 is then rotated in the xy-plane, and the n-step image process is repeated, followed by another rotation and the capture of another n images, for a total of 3n images. After the 3n images are obtained, the interference pattern 206 is moved in the z-direction and another set of 3n images is obtained. FIGS. 4A-4C show top views (i.e., xy-plane) of the objective lens 128 and the interference pattern 206. In FIG. 4A, the bright lines of the interference pattern 206 are initially angled at −60°. The interference pattern 206 is stepped through five periods of a spatial interval, as described above with reference to FIG. 3, with a fluorescent image captured at each step. In FIG. 4B, the interference pattern 206 is rotated through 60° so that the bright lines are angled at 0°. The interference pattern 206 is again stepped through five periods of a spatial interval, as described above with reference to FIG. 3, with a fluorescent image captured at each step. In FIG. 4C, the interference pattern 206 is finally rotated through an additional 60° so that the bright lines are angled at 60°. The interference pattern 206 is again stepped through five periods of a spatial interval, as described above with reference to FIG. 3, with a fluorescent image captured at each step. The interference pattern 206 is rotated 3 times in the xy-plane by 60°, with each rotation followed by the capture of 5 images for a total 15 images. These fluorescent images are used to solve a system of linear equations to recover a three-dimensional optically sectioned image with approximately double the resolution obtained by conventional wide-field microscopy.

Figure 5A:
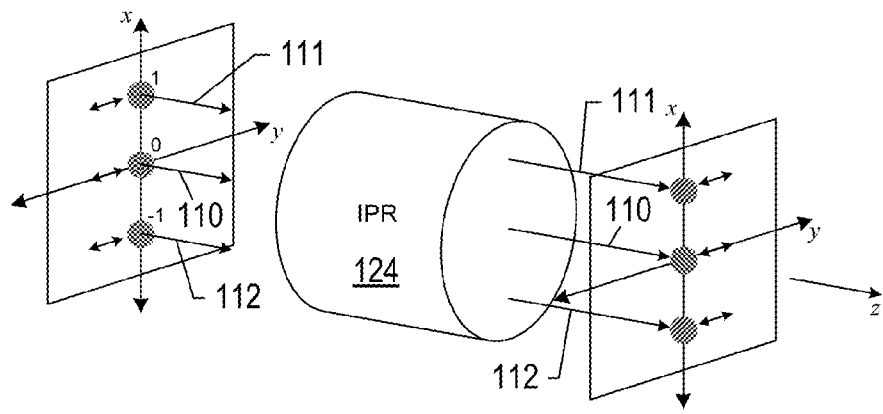
FIGS. 5A-5C show an example representation of an interference pattern rotator used to rotate three substantially parallel beams.
Figure 5B:
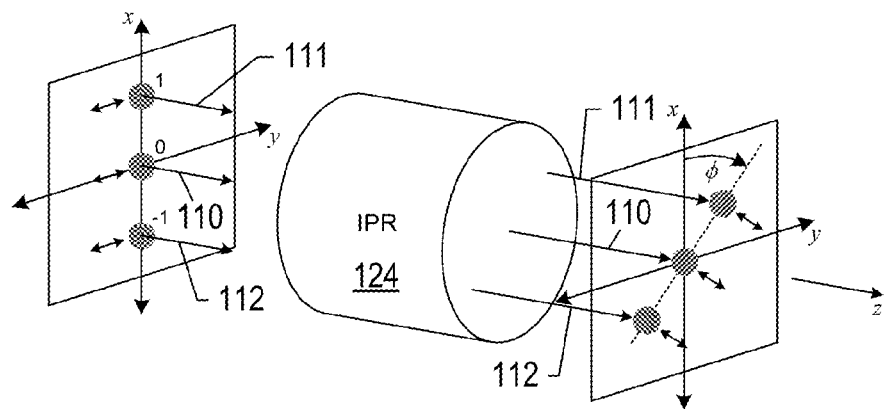
Figure 5C:
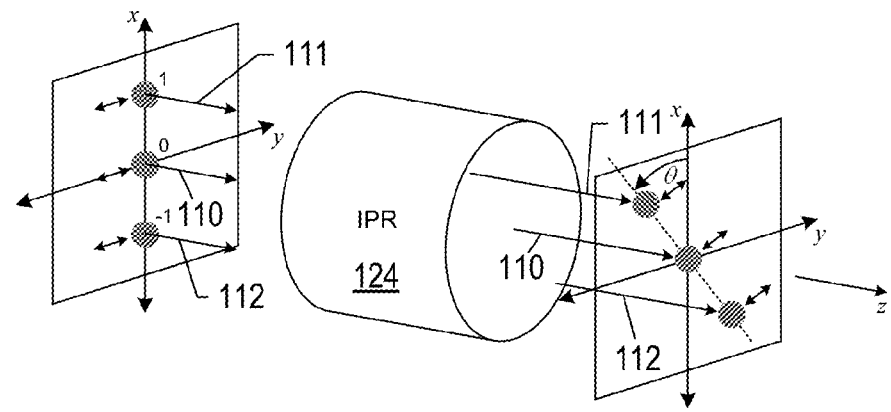

The IPR 124 is used to rotate the interference pattern in the yz-plane about the optical axis 302. FIGS. 5A-5C show use of the IPR 124 to rotate the beams 110-112 and polarization associated with each of the beams 110-112. In FIG. 5A, the IPR 124 preserves the orientation of the beams 110-112 so that the beams 110-112 travel in the xz-plane with the polarization associated with each beam oriented perpendicular to the x-axis. In FIG. 5B, the IPR 124 rotates the beams 110-112 through an angle φ about the central $0^{th}$ order diffracted beam axis (i.e., z-axis) and rotates the polarization associated with each beam through the same angle. In FIG. 5C, the IPR 124 rotates the beams 110-112 through an angle θ about the central $0^{th}$ order diffracted beam axis and rotates the polarization associated with each beam through the same angle.

Figure 6:
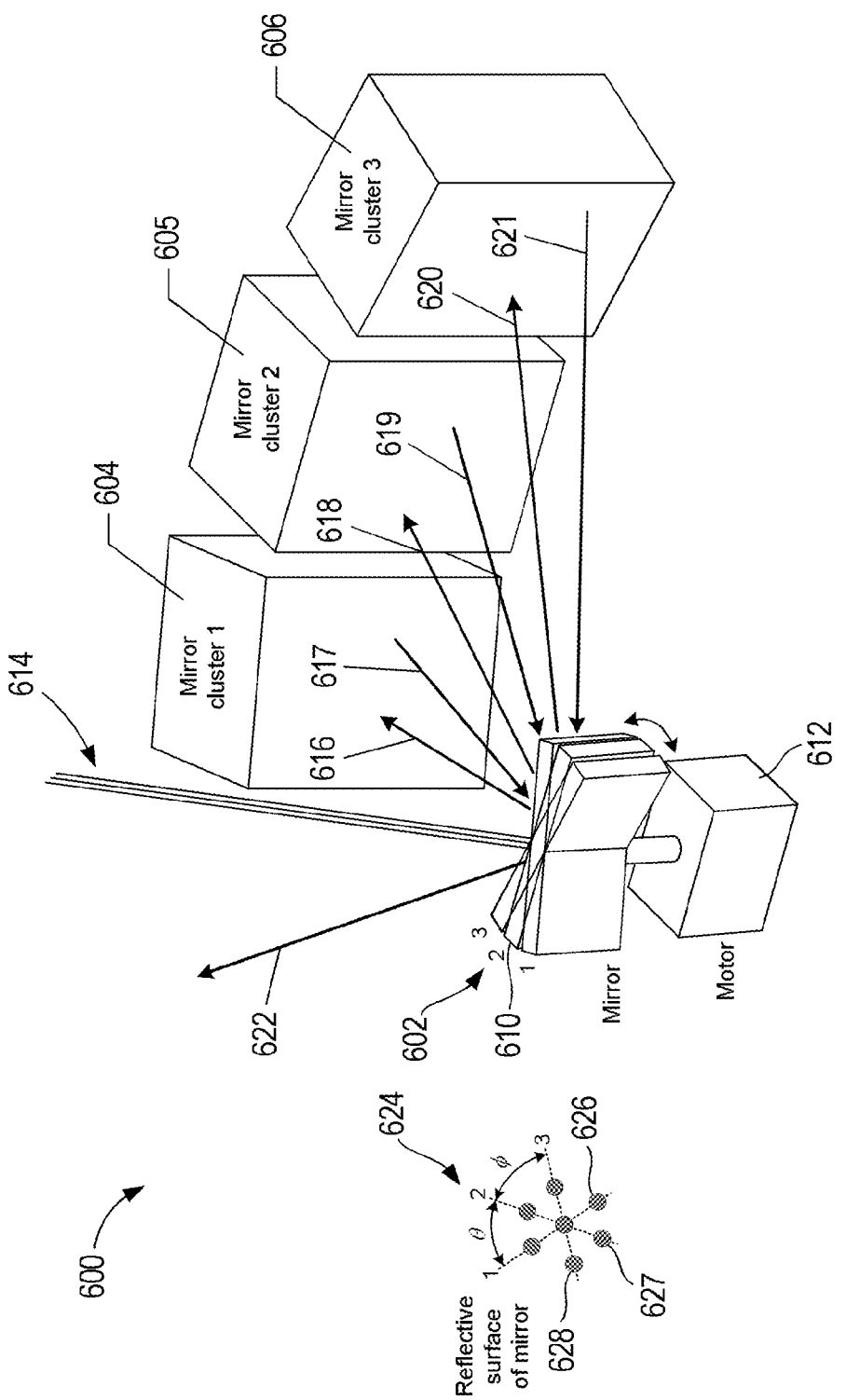
FIG. 6 shows an isometric view of an example implementation of an interference pattern rotator.

FIG. 6 shows an isometric view of an example IPR 600. The IPR 600 includes a scanning mirror 602 and three separate mirror clusters 604-606. FIG. 6 shows an example of scanning mirror 602 that includes a flat mirror 610 attached to a rotatable shaft of a motor 612. The motor 612 can be galvanometer, in which case the scanning mirror 602 is a galvanometer mirror, or the motor 612 can be a stepper motor that divides rotation of the mirror 610 into a series of rotational steps or any other kind of motor that imparts precise rotation of the mirror 610. Alternatively, the scanning mirror can be a piezoelectric controlled mirror. As shown in FIG. 6, the reflective surface of the mirror 610 is rotated using the motor 612 to in turn face each of the mirror clusters 604-606. Three parallel lines 614 represent the $0^{th}$ and $\pm 1^{st}$ order diffracted beams output from a grating, such as the splitter 304 described above. As shown in FIG. 6, three rotational positions 1, 2 and 3 of the mirror 610 are identified. Positions 1, 2 and 3 correspond to particular rotational positions of the mirror 610 with respect to mirror clusters 1, 2 and 3. Each of the mirror clusters imparts a different angle of rotation to the beams 614 and matching angle of rotation in the polarization associated with the beams. The IPR 600 is operated as follows. When the mirror 610 is rotated into position 1, the beams 614 are reflected off of the mirror 610 toward mirror cluster 1 604 as represented by directional arrow 616. Mirror cluster 1 604 rotates the beams and associated beam polarizations through a first rotational angle and reflects the beams back to the mirror 610 as represented by directional arrow 617. When the mirror 610 is rotated into position 2, the beams 614 are reflected off of the mirror 610 toward mirror cluster 2 605 as represented by directional arrow 618. Mirror cluster 2 605 rotates the beams through a second rotational angle and reflects the beams back to the mirror 610 as represented by directional arrow 619. When the mirror 610 is rotated into position 3, the beams 614 are reflected off of the mirror 610 toward mirror cluster 3 606 as represented by directional arrow 620. Mirror cluster 3 606 rotates the beams through a third rotational angle and reflects the beams back to the mirror 610 as represented by directional arrow 621. Directional arrow 622 represents the rotated beams reflected off of the mirror 610. FIG. 6 includes a view 624 of the reflective surface of the mirror 610 that represents co-alignment of the rotated beams reflected off of the surface of the mirror 610. Dashed lines 626-628 represent the three different rotations imparted on the three beams by the mirror clusters 604-606 as viewed from the reflective surface of the mirror 610. Dashed line 626 represents the orientation of the beams produced by mirror cluster 1 604, dashed line 627 represents the orientation of the beams produced by mirror cluster 2 605, and dashed line 628 represents the orientation of the beams produced by mirror cluster 3 606. The IPR 600 may also include an exit path mirror located in the path of the beam 622 to provide additional control over the direction in which the beams are output from the IPR 600.

Figure 7A:
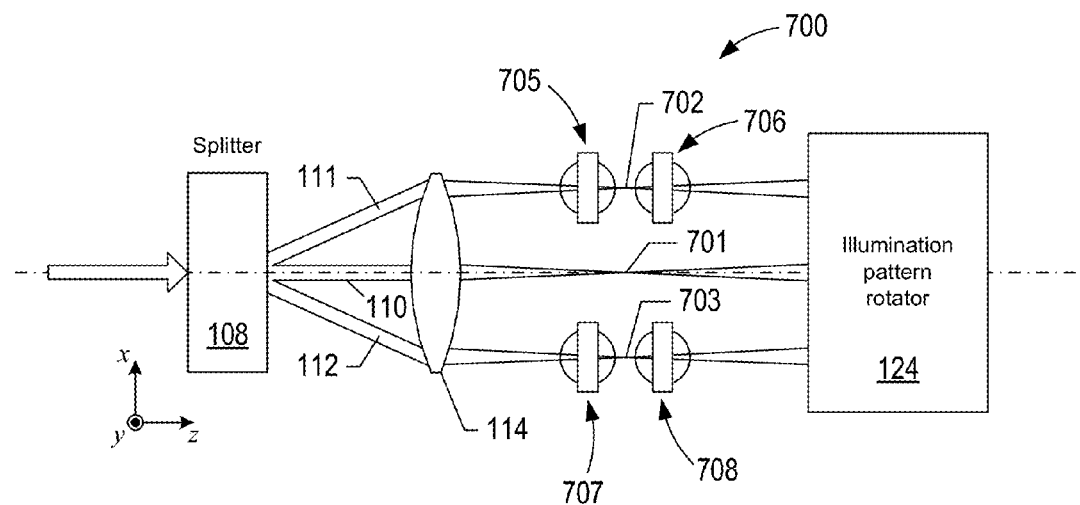
FIG. 7A shows an enlarged view of an example illumination phase control.
Figure 7B:
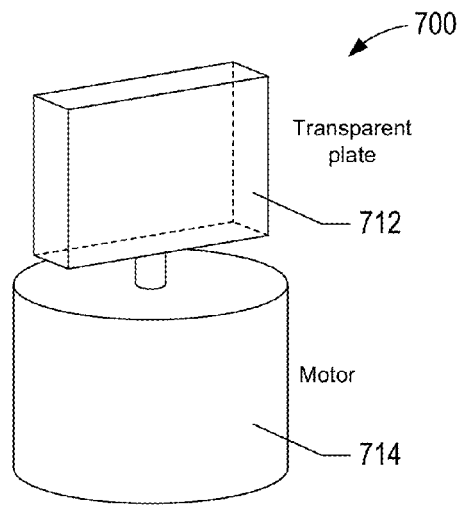
FIG. 7B shows an isometric view of an example rotatable window.

FIG. 7A shows an enlarged view of an example implementation of an IPC 700 located between the lens 114 and the IPR 124 as shown in FIG. 1. The beams 110-112 are output from the lens 114 along substantially parallel paths, and the beams are focused by the lens 114 to focal points 701-703, respectively. As shown in the example of FIG. 7A, the system 700 is composed of four separate rotatable windows 705-708. Two of the rotatable windows 705 and 706 intersect the outside beam 111 and are located on opposite sides of the focal point 702. The other two rotatable windows 707 and 708 intersect the other outside beam 112 and are also located on opposite sides of the focal point 703. FIG. 7B shows an isometric view of an example rotatable window 710 that includes a flat transparent plate 712 attached to a rotatable shaft of a motor 714. The transparent plate 712 can be composed of glass or another suitable transparent material, and the motor 714 can be a galvanometer or a stepper motor that divides rotation of the plate 712 into a series of rotational steps or any other kind of motor that can be used to rapidly rotate the plate 712.

Figure 8A:
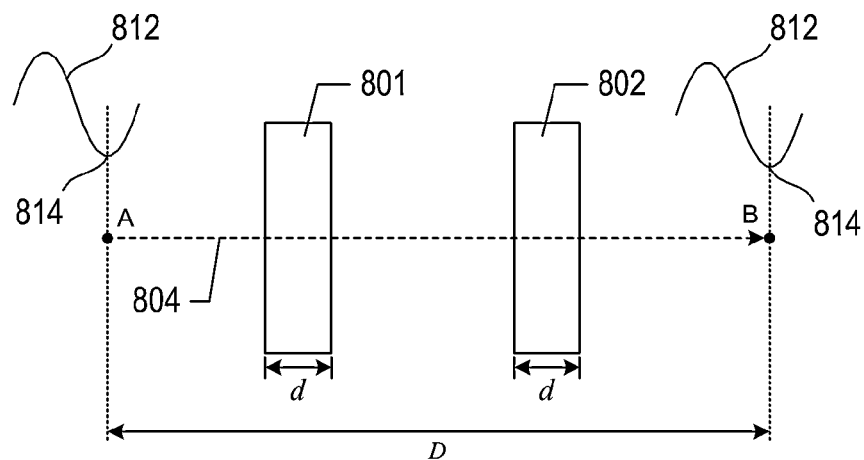
FIGS. 8A-8B show a pair of transparent plates of two rotatable windows.
Figure 8B:
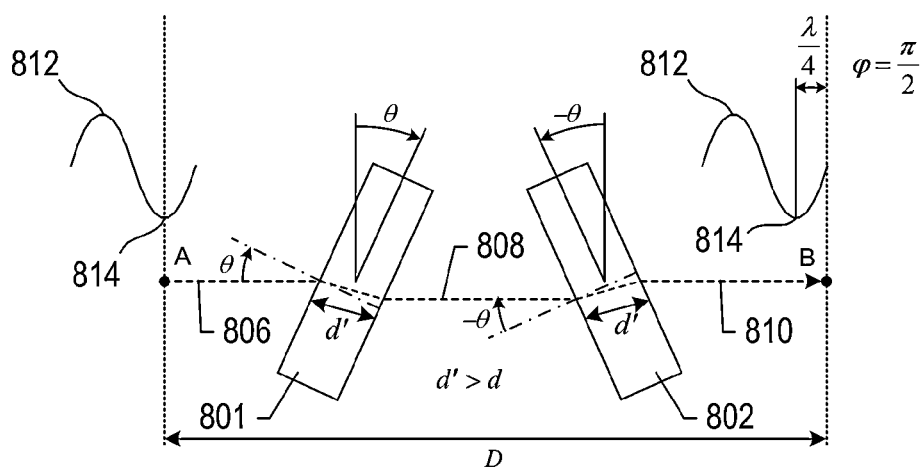

The transparent plates of each pair of rotatable windows intersect one of the beams and when rotated change the path length of the beam, which, in turn, results in a change in the relative phase of the beams that are focused to form an interference pattern. The transparent plates of a pair of rotatable windows are rotated with the same angular magnitude but in opposite directions in order to maintain the path of the beam. FIGS. 8A-8B show a pair of transparent plates 801 and 802 of two rotatable windows. In the example of FIG. 8A, when the plates 801 and 802 are parallel and oriented perpendicular to a collimated beam of light transmitted from a point A to a point B represented by a dashed-line ray 804. The beam travels an overall distance, D, with a minimum distance, d, traveled through each of the plates 801 and 802. In the example of FIG. 8B, the same plates 801 and 802 are rotated in opposite directions with the same angular magnitude θ. Dashed line 806 represents the initial path the beam travels until the beam reaches the rotated plate 801. The beam is refracted by the rotated plate 801 and placed on a path 808 substantially parallel to the initial path 806. The beam is then refracted again by the rotated plate 802 and is placed on a path 810 that is aligned with the initial path 806. In other words, by rotating the plates with the same angular magnitude but in opposite directions, the initial path of the beam is maintained. However, because the plates 801 and 802 are rotated, the beam is refracted. As a result, the beam travels a longer distance, d', through each of the plates 801 and 802 (i.e., d'>d) which results in a relatively larger phase shift than when the beam travels through parallel plates 801 and 802, as shown in FIG. 8A. In other words, as the beam travels from point A to point B through the parallel oriented plates 801 and 802 shown in FIG. 8A, the amount by which the phase of the beam is retarded depends on the refractive index of the plates 801 and 802 and on the distance d. As a result, the beam acquires a phase shift that is proportional to 2d and the refractive index of the plates. However, when the plates 801 and 802 are rotated as shown in FIG. 8B, the longer distance d' the beam travels through each of the plates 801 and 802 results in an even larger phase shift. For example, FIGS. 8A-8B also represents snapshots of an exaggerated segment 812 of an electromagnetic wave of wavelength λ at an initial time $t_0$ and a later time $t_1$. In FIG. 8A, at time $t_0$, a minimum 814 of the segment 812 is located at the point A, and at the later time $t_1$, the same minimum 814 reaches the point B. On the other hand, in FIG. 8B, at the initial time $t_0$, the minimum of the segment 812 is located at the point A, but at the later time $t_1$, the same minimum 814 is λ/4 from the point B, which corresponds to a phase shift of $\phi=\pi/2$.

Figure 9:
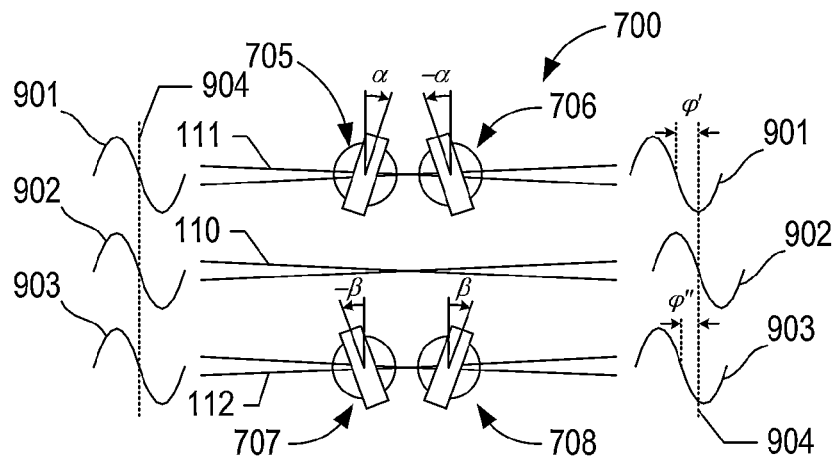
FIG. 9 shows a snapshot of example phase shifts acquired by two beams of light transmitted through an illumination phase control.

FIG. 9 shows a snapshot of example phase shifts applied to the beams 110-112 based on rotating the plates of the rotatable windows 705 and 706 in opposite directions with angular magnitude α and rotating the plates of the rotatable windows 707 and 708 in opposite directions with angular magnitude β. In the example of FIG. 9, in order to illustrate the rotatable windows 705-708 creation of different relative phase shifts in the beams 111 and 112, segments 901-903 of electromagnetic waves associated with the beams 110-112 are show as entering the IPC 700 with no phase separation, as indicated by a dashed line 904 that intersects each of segments at the same point. At a later time, when the segments 901 and 903 have passes through the rotatable windows 705-708 as described above with reference to FIG. 8, the segment 901 has acquired a relative phase shift of φ', and the segment 903 has acquired a relative phase shift of φ", with respect to the beam 110.

An IPC, such as the IPC 700, described above provides switching times on the order of 0.2 milliseconds. When a transparent plate is in a high-precision range of approximately 1° of normal incidence, the effective path length can be adjusted with a precision on the order of 0.1 nanometers.

Figure 10A:
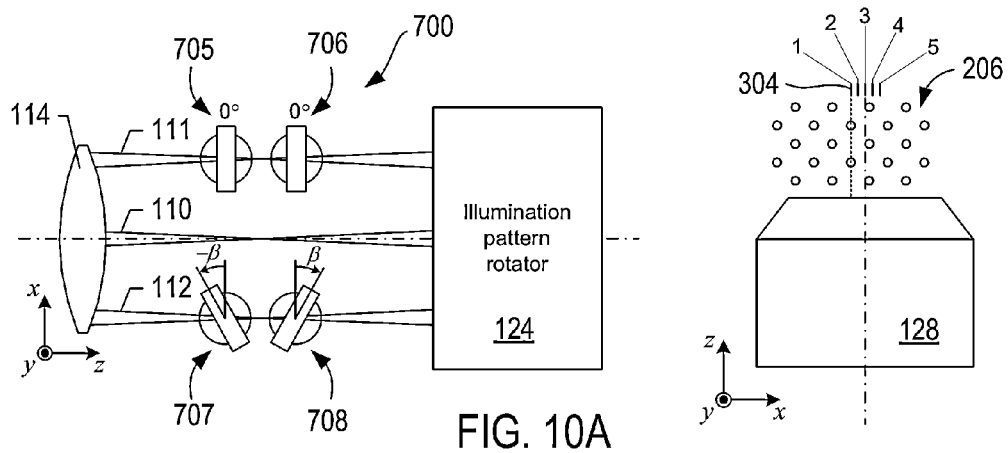
FIGS. 10A-10C show an illumination phase control reconfigured to change the position of a structure illumination pattern.
Figure 10B:
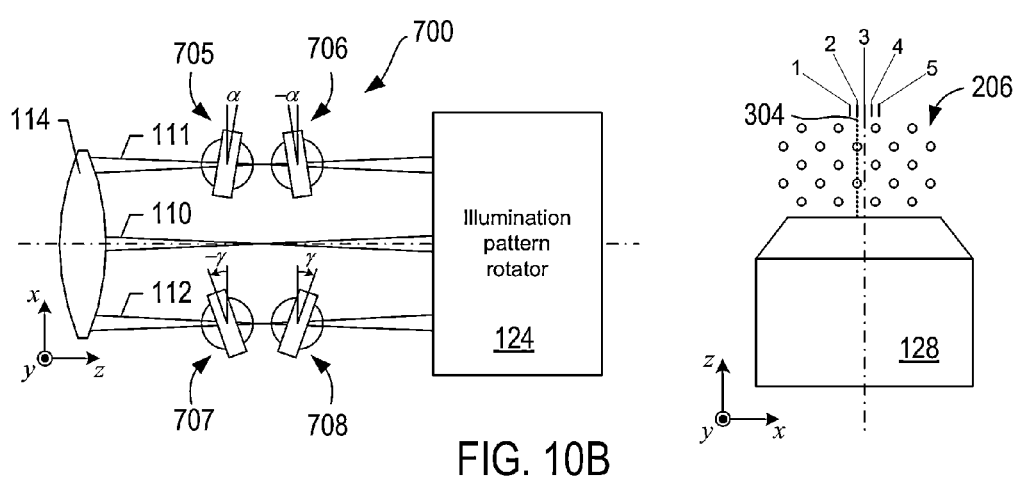
Figure 10C:
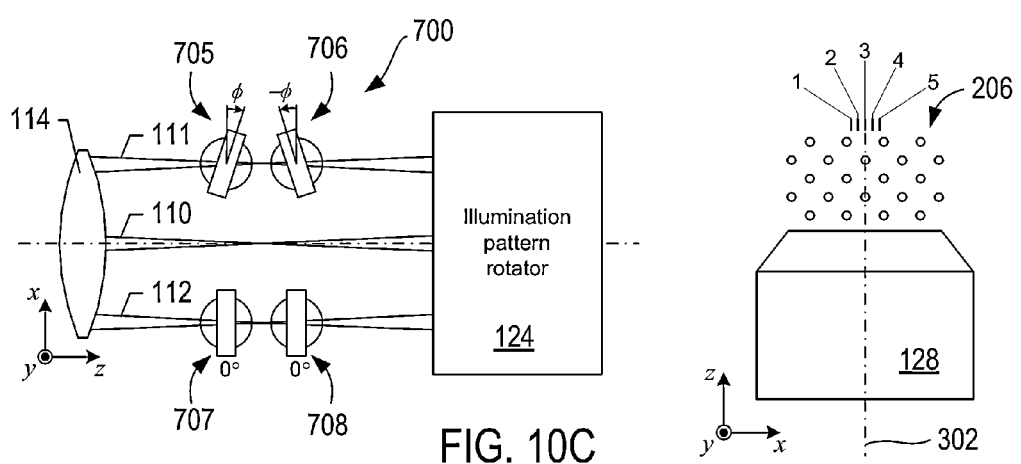

The transparent plates of the rotatable windows are rotated into particular angles to step the interference pattern through periods along a spatial interval as described above with reference to FIG. 3. FIGS. 10A-10C show examples of three hypothetical sets of angles the transparent plates of the rotatable windows are rotated into to center the interference pattern 206 in the periods 1, 2 and 3 described above with reference to FIG. 3. In the example of FIG. 10A, the plates of the windows 705 and 706 at 0°, and the plates of the windows 707 and 708 are rotated with maximum angles of rotation −β and β, respectively, to center the interference pattern 206 within period 1. In the example of FIG. 10B, the plates of the windows 705 and 706 are rotated with angles α and −α, respectively, and the plates of the windows 707 and 708 are rotated to smaller angles −γ and γ, respectively, which creates relative phase differences between the beams 110-112 to center the interference pattern 206 within period 2. In the example of FIG. 10C, the plates of the windows 705 and 706 are rotated to angles φ and −φ, respectively, and the plates of the windows 707 and 708 are rotated to 0°, which creates relative phase differences between the beams 110-112 to center the interference pattern 206 within period 3.

Figure 11:
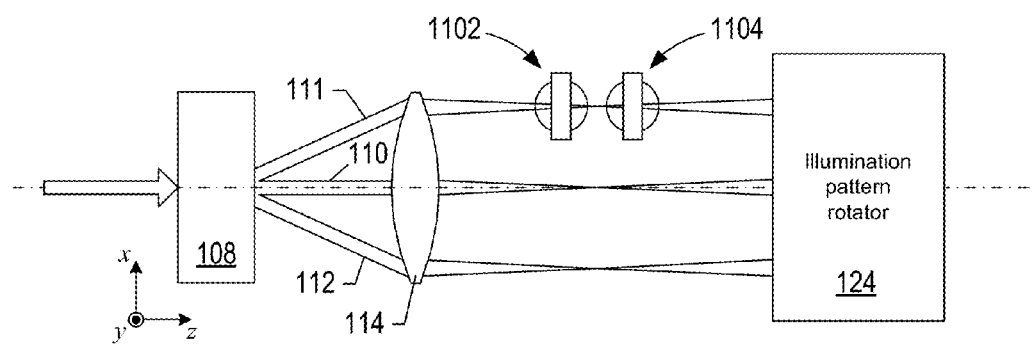
FIG. 11 shows an example illumination phase control implemented with a single pair of rotatable windows.
Figure 12:
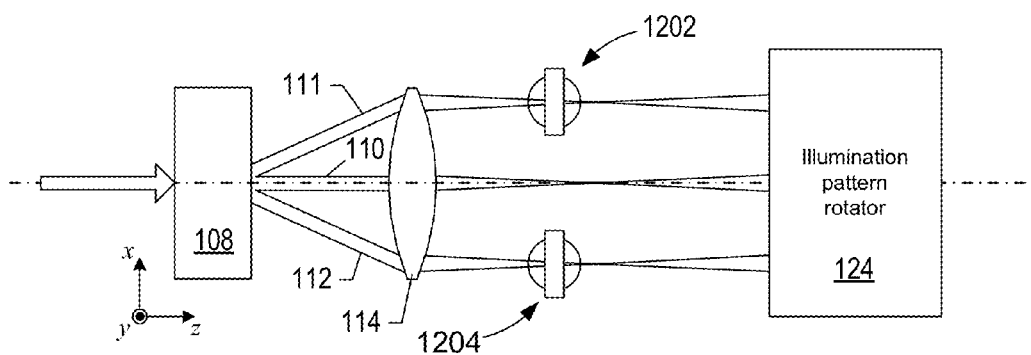
FIG. 12 shows an example illumination phase control implemented with two separate rotatable windows.

IPCs are not limited to two pairs of rotatable windows located along the two outside beams, as described above with reference to FIG. 7. In alternative embodiments, an IPC can be implemented with three pairs of rotatable windows, where each pair of rotatable windows is located along one of the three beams. For example, the IPC 700 can be modified to include a third pair of rotatable windows that intersect the beam 110 in the same manner the rotatable windows 705-708 are positioned to intersect the beams 111 and 112. Alternatively, an IPC can be implemented with as few as a single pair of rotatable windows located along any one of the beams between the lens 114 and the IPR 124, as shown in the example of FIG. 11 where a single pair of rotatable windows 1102 and 1104 intersects the beam 111. Alternatively, an IPC can be implemented with one pair of rotatable windows that intersection the central beam 110 and a second pair that intersects either one of the outside beams 111 and 112. In alternative embodiments, an IPC can be implemented with only a single rotatable window placed in each one, two or all three of the beam paths. For example, in FIG. 12, an IPC is composed of rotatable windows 1202 and 1204 that intersect beams 111 and 112. Note that when only one rotatable window is disposed in a beam path to control the relative phase of the beams, as the transparent plate is rotated to steeper and steeper angles of incidence, sensitivity increases and the precision of phase control may be degraded. In addition, there is a small amount of beam translation, as described above with reference to FIG. 8B.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the following claims and their equivalents:

The invention claimed is:

1. A microscopy instrument comprising:
   a splitter to receive a monochromatic beam of light and split the beam into at least three separate coherent beams;
   an illumination phase control including at least one rotatable window, the at least one rotatable window configured to apply at least one phase shift to at least one of the at least three separate coherent beams;
   an objective lens to focus the at least three separate coherent beams to form an interference pattern, wherein the illumination phase control is configured to change a position of the interference pattern with the at least one rotatable window to be rotated with respect to at least one path of the at least three separate coherent beams; and
   an illumination pattern rotator disposed between the illumination phase control and the objective lens, the illumination pattern rotator to rotate the at least three separate coherent beams output from the illumination phase control, which results in the interference pattern to be rotated through the same angle.

2. The instrument of claim 1, wherein the splitter further comprises a one-dimensional grating.

3. The instrument of claim 1, wherein the splitter further comprises at least two beamsplitters.

4. The instrument of claim 1, wherein the illumination phase control including at least one rotatable window further comprises at least one pair of rotatable windows, each of the at least one pair positioned to intersect one of the at least three separate coherent beams.

5. The instrument of claim 4, wherein the at least one pair of rotatable windows further comprises a first transparent plate attached to a first motor to rotate the first transparent plate and a second transparent plate attached to a second motor to rotate the second transparent plate, wherein the first and second plates intersect one of the at least three separate coherent beams.

6. The instrument of claim 5, wherein the first transparent plate and the second transparent plate are to rotate in opposite directions with a nearly identical angular magnitude with respect to a coherent beam path.

7. The instrument of claim 1, wherein the illumination phase control including at least one rotatable window further comprises a single rotatable window positioned to interest one of the at least three separate coherent beams.

8. The instrument of claim 1, wherein the at least one rotatable window further comprises a transparent plate attached to a motor to rotate the transparent plate, wherein the transparent plate intersects one of the at least three separate coherent beams.

9. The instrument of claim 8, wherein the motor further comprises one of a galvanometer motor, piezo-electric device, and a stepper motor.

10. The instrument of claim 1 further comprising:
   a dichroic mirror to reflect the at least three separate coherent beams to the objective lens and transmit fluorescent light emitted from a specimen to be illuminated by the interference pattern;
   a photodetector array; and
   a filter and image optics disposed between the dichroic mirror and the photodetector, wherein the filter and optics are to focus the fluorescent light onto the photodetector.

11. A method for shifting an interference pattern in a structured illumination microscopy instrument, the method comprising:
   splitting a monochromatic beam of light into at least three separate coherent beams using a splitter;
   applying at least one phase shift to at least one of the at least three separate coherent beams using an illumination phase control including at least one rotatable window;
   focusing the at least three separate coherent beams to form an interference pattern using an objective lens, wherein the at least one rotatable window is to be rotated with respect to at least one path of the at least three separate coherent beams to change a position of the interference pattern; and
   rotating the at least three separate coherent beams output from the illumination phase control, which results in the interference pattern to be rotated through a same angle using an illumination pattern rotator disposed between the illumination phase control and the objective lens.

12. The method of claim 11, wherein the splitter further comprises a one-dimensional grating.

13. The method of claim 11, wherein the splitter further comprises at least two beamsplitters.

14. The method of claim 11, wherein the illumination phase control including at least one rotatable window further comprises at least one pair of rotatable windows, each of the at least one pair positioned to intersect one of the at least three separate coherent beams.

15. The method of claim 14, wherein the at least one pair of rotatable windows further comprises a first transparent plate attached to a first motor to rotate the first transparent plate and a second transparent plate attached to a second motor to rotate the second transparent plate, wherein the first transparent plate and the second transparent plate intersect one of the at least three separate coherent beams.

16. The method of claim 15, wherein the first transparent plate and the second transparent are to rotate in opposite directions with a nearly identical angular magnitude with respect to a coherent beam path.

17. The method of claim 11, wherein the illumination phase control including at least one rotatable window further comprises a single rotatable window positioned to intersect interest one of the at least three separate coherent beams.

18. The method of claim 11, wherein the rotatable window further comprises a transparent plate attached to a motor to rotate the transparent plate, wherein the transparent plate intersects one of the at least three separate coherent beams.

* * * * *